(12) United States Patent
Hakim et al.

(10) Patent No.: US 7,957,846 B2
(45) Date of Patent: *Jun. 7, 2011

(54) ENERGY ARBITRAGE BY LOAD SHIFTING

(75) Inventors: David B. Hakim, Rockville, MD (US);
Douglas Ricardo Danley, Germantown, MD (US); Michael Caplan, London (GB)

(73) Assignee: GridPoint, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/534,236

(22) Filed: Aug. 3, 2009

(65) Prior Publication Data

US 2009/0326729 A1 Dec. 31, 2009

Related U.S. Application Data

(63) Continuation of application No. 11/558,068, filed on Nov. 9, 2006, now Pat. No. 7,590,472.

(51) Int. Cl.
*H02J 15/00* (2006.01)
*G06F 17/00* (2006.01)
(52) U.S. Cl. ......... 700/295; 700/291; 700/296; 705/412
(58) Field of Classification Search .............. 700/291, 700/296, 295; 705/412
See application file for complete search history.

(56) References Cited

U.S. PATENT DOCUMENTS

| | | | | |
|---|---|---|---|---|
| 7,590,472 B2 * | 9/2009 | Hakim et al. | ................. | 700/295 |
| 2004/0044442 A1 * | 3/2004 | Bayoumi et al. | .............. | 700/286 |
| 2004/0117330 A1 * | 6/2004 | Ehlers et al. | ................... | 705/412 |
| 2007/0282495 A1 * | 12/2007 | Kempton et al. | ............... | 701/22 |
| 2007/0284163 A1 * | 12/2007 | Heap et al. | .................... | 180/65.2 |

* cited by examiner

*Primary Examiner* — Albert Decady
*Assistant Examiner* — Steven R Garland
(74) *Attorney, Agent, or Firm* — Greenberg Traurig LLP

(57) ABSTRACT

Methods and systems are provided for realizing energy cost savings through load shifting utilizing a battery bank that may serve as a battery back-up on a premises for providing power in the event of a grid power outage or curtailment. A budget of unreserved cycles of battery charging and discharging is determined, taking into account the rated battery life in terms of both time (e.g., years) and number of cycles. That cycle budget is allocated to days of the year identified as days on which the greatest savings can be realized through load shifting. These days are identified by taking into account the peak and off-peak usage rates applicable on those days, any rate tiers that may be entered as a result of the additional energy expended to load shift, and the round trip efficiency of the charge/discharge cycles. Load shifting is executed in accordance with an established schedule of the identified days, by discharging the batteries during peak usage hours and charging the batteries during off-peak periods. In the event the budget of unreserved cycles exceeds the number of profitable days for load shifting, the depth of discharge on each cycle may be increased to realize greater savings on the scheduled days, at the tolerable cost of losing cycles not expected to be used in any event.

30 Claims, 8 Drawing Sheets

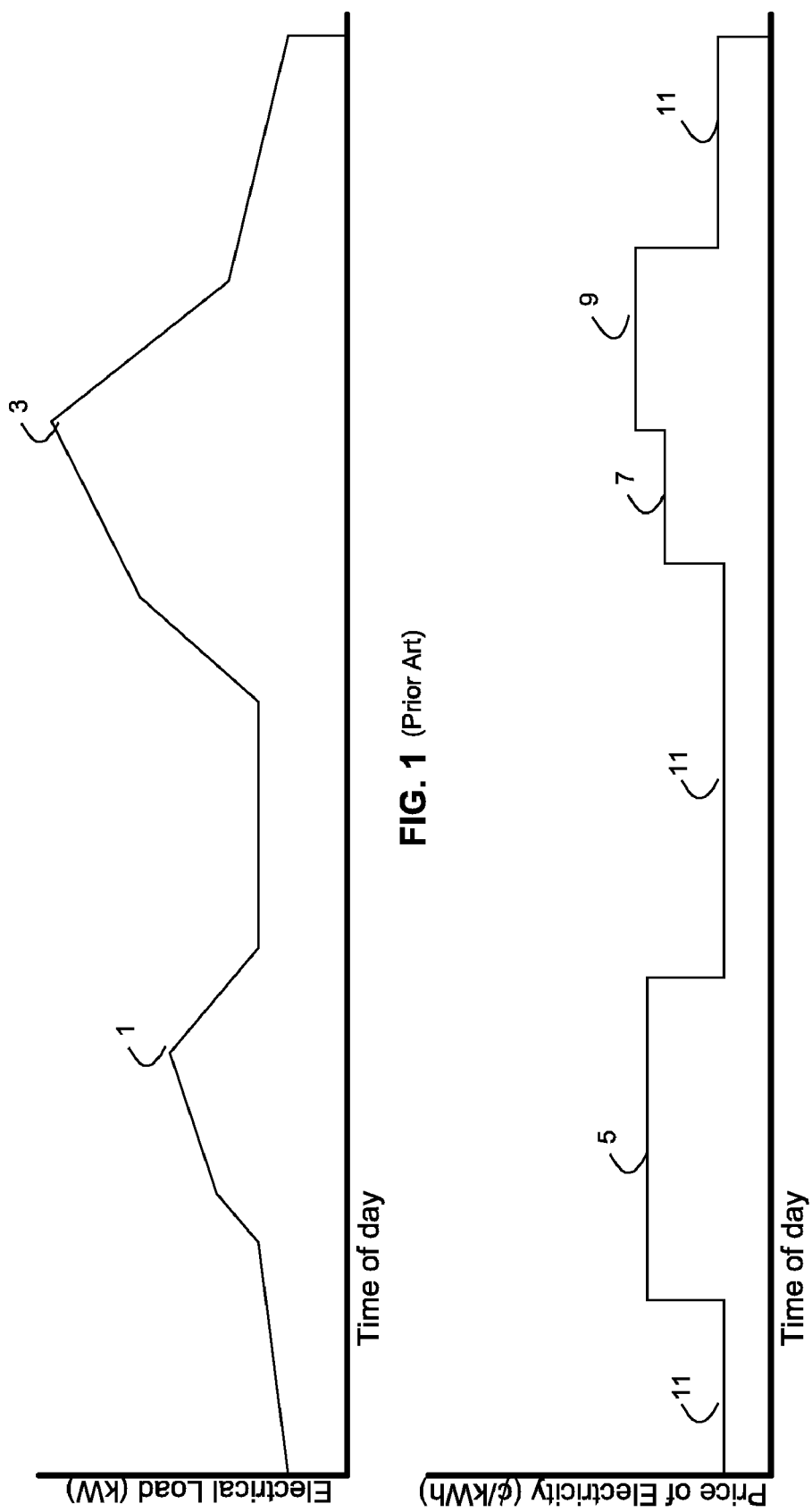

ENERGY ARBITRAGE BY LOAD SHIFTING

This patent application is a continuation of U.S. patent application Ser. No. 11/558,068 filed Nov. 9, 2006 now U.S. Pat. No. 7,590,472. The disclosure of the above application is incorporated herein by reference.

BACKGROUND

The present invention relates generally to energy management, and more particularly to electrical energy load shifting in order to reduce energy costs. More particularly, the invention concerns systems and methods that permit electrical energy to be purchased and stored during off-peak hours, and the stored energy to be used and/or sold back to the power grid during peak hours, to thereby realize savings in energy costs.

Energy demand at a premises typically varies over the time of day. In a typical home, there is a peak in the morning when the family gets up, turns on lights, radios and televisions, cooks breakfast, and heats hot water to make up for the amount used in showers. When the family leaves for work and school, it may leave the clothes washer and dishwasher running, but when these are done, demand drops to a lower level, but not to zero, as the air conditioners, refrigerators, hot water heaters and the like continue to operate. Usage goes up as the family returns, peaking around dinner when the entire family is home. This creates the typical "double hump" demand curve as shown in FIG. 1. Therein, it is seen that there is a morning peak 1 and an evening peak 3 of electrical energy demand.

Businesses tend to follow different patterns depending on the nature of the business. For example, usage is typically low when the building is closed, and may be relatively constant when the office building is open. In extreme climates where air conditioning cannot be cut back overnight, energy use over the course of the day is more constant. Businesses like restaurants may start later in morning and their peak may extend further into the evening. A factory with an energy intensive process operating three shifts may show little or variation over the course of the day.

The incremental cost to a utility company for generating or purchasing electrical energy increases dramatically during periods of peak use over periods of off-peak usage. Using such information, electrical utility companies will often employ time of day-based rate schedule to charge a significantly higher rate for electrical energy (e.g., cost per kilowatt-hour) consumed during peak usage hours, as compared to energy consumed during off-peak hours, in order to compensate for its higher costs. For example, homes and small businesses may pay for electricity on a per-kilowatt hour basis with one rate applying during off-peak hours, and another, higher, rate applying during peak hours. The higher rates charged during peak usage periods can lead to significantly higher energy costs for the consumer, especially when the consumer's period(s) of high demand coincides with or falls within the interval set by the utility as peak hours.

The irregular curve in the graph of FIG. 2 plots a hypothetical price of electricity to a consumer (in cents/kWh) from the grid over the course of a day. As is common in many areas, this price varies significantly. The time of day rates are designed to reflect the marginally higher cost of power production at the peak demand periods of morning and early evening. At these times, utilities must dispatch power from their least efficient units, while, when cost is lower, they need provide power only from the most efficient units. In this rate diagram, there is a broad morning peak rate period 5, a "shoulder" rate period (also commonly referred to as a "partial peak" or "interim peak" period) in the early evening, and a peak rate period 9 in an evening period following the shoulder rate period. Remaining are off-peak rate periods 11.

Electric utilities have on occasion arranged to install special devices in homes and businesses that, when remotely activated by the utility, cut power to certain devices (e.g., air conditioners or hot water heaters) during peak loading conditions. Customers who agree to install such devices are given discounts or other incentives for installing such devices, and in exchange the utility is able to better manage energy demand remotely. However, such arrangements are made for the benefit of the utility, whose interests may be at odds with the interests and energy requirements of the consumer.

Recently, devices have been developed that help users reduce the cost of electricity purchases from the power grid by storing electricity in batteries, which are then drawn down during peak hours to reduce demand from the grid. The batteries can be charged during non-peak hours, thus reducing the total cost of electricity, and electricity can be sold back to the grid during favorable conditions. Some of these devices can produce energy from secondary sources such as solar panels, fuel cells, and other sources. Such devices, e.g., as described in U.S. patent application Ser. No. 11/144,834, filed on Jun. 6, 2005 (entitled "Optimized Energy Management System"), can also reschedule deferrable electrical consumption to off-peak hours. For example, a dishwasher can be automatically scheduled to turn on during off-peak hours.

It would be desirable to help energy consumers better manage the use of electrical energy storage devices, e.g., batteries, for more effectively shifting the consumption of electrical energy from peak to off-peak hours, to thereby reduce overall electrical energy consumption costs. Apparatus, systems and methods in accordance with the present invention provide significant advancements in this regard.

SUMMARY OF THE INVENTION

In accordance with an aspect of the invention, a computer-assisted method of electrical energy load shifting is provided, utilizing an electrical energy storage device (e.g., an electrochemical battery) connected to receive electrical energy from an electrical power grid. In the method, a budget is established of unreserved cycles of discharging and charging the electrical energy storage device for load shifting purposes within a given time period (e.g., one year). Next, a schedule for load shifting within sub-parts (e.g. days) of the time period is established based upon the budget and input data regarding multiple rate levels applicable to electrical energy available from the electrical power grid during the sub-parts of the time period. Load shifting cycles are then caused to be executed within one or more of the sub-parts of the time period, in accordance with the schedule, by discharging electrical energy stored in the electrical energy storage device in a first interval for which a first rate is applicable to energy available from the grid, and charging the electrical energy storage device with electrical energy obtained from the grid during a second interval for which a second rate lower than the first rate is applicable to energy obtained from the grid.

In other aspects, the invention is embodied in an electrical energy management system including a computer having a memory storing computer executable instructions that, when executed by the computer, cause the system to execute steps as previously described, as well as an electronic data storage medium containing such computer executable instructions.

In one embodiment, the budget of cycles available for load shifting is computed by a data processor based at least in part on an input indicating a cycle life of the electrical energy storage device; an input indicating a rated time life of the electrical energy storage device; and an input number of cycles reserved for purposes other than load shifting.

The computation of a cost savings (S) per unit of energy shifted per load shifting cycle may be based on the formula S=P−(O/E), wherein P is a peak rate applicable to energy obtained from the grid during a first time interval of any given day, 0 is an off-peak rate applicable to energy obtained from the grid during a second time interval of the given day, and E is a measure of the efficiency of the electrical energy transfer during a cycle of discharging and charging the electrical energy storage device.

In the case of usage-based tiers being applicable, the step of establishing the schedule may comprise dividing the time periods up into rate periods used to calculate the tier that the electrical energy usage falls into; recording expected energy usage for each rate period; recording a tier boundary representing a maximum energy usage within a rate period before crossing into the next tier; calculating an additional amount of energy that will be used by a load shifting cycle; calculating for each rate period the number of cycles Y of load shifting that can be executed before crossing into the next tier; subdividing the rate periods into days corresponding to number of cycles Y, and days remaining; and calculating the quantity P−(O/E) for days remaining, with values for the next highest tier.

In accordance with the invention, the sub-parts of the time period may comprise days, and the executing of load shifting cycles may comprise discharging the energy storage device during a first time interval of each day to which a peak rate P is applicable to energy obtained from the grid, and charging the energy storage device with energy obtained from the grid during a second time interval of each day to which an off-peak rate 0 is applicable.

These and other aspects, objects, features and advantages of the present invention will be evident and fully understood from the following detailed description, taken in connection with the appended drawings.

BRIEF DESCRIPTION OF THE DRAWINGS

FIG. 1 is a graph illustrating a typical residential demand curve for electrical energy consumption over the course of a single day.

FIG. 2 is a graph providing an illustration of how the cost of electrical power can vary with the level of demand over the course of a given day, corresponding to peak, shoulder and off-peak demand periods

FIG. 4 is an illustrative screen shot taken from a Split-and-Sort demonstrator application in accordance with an aspect of the invention.

DETAILED DESCRIPTION OF EXEMPLARY EMBODIMENTS

Figure 3:
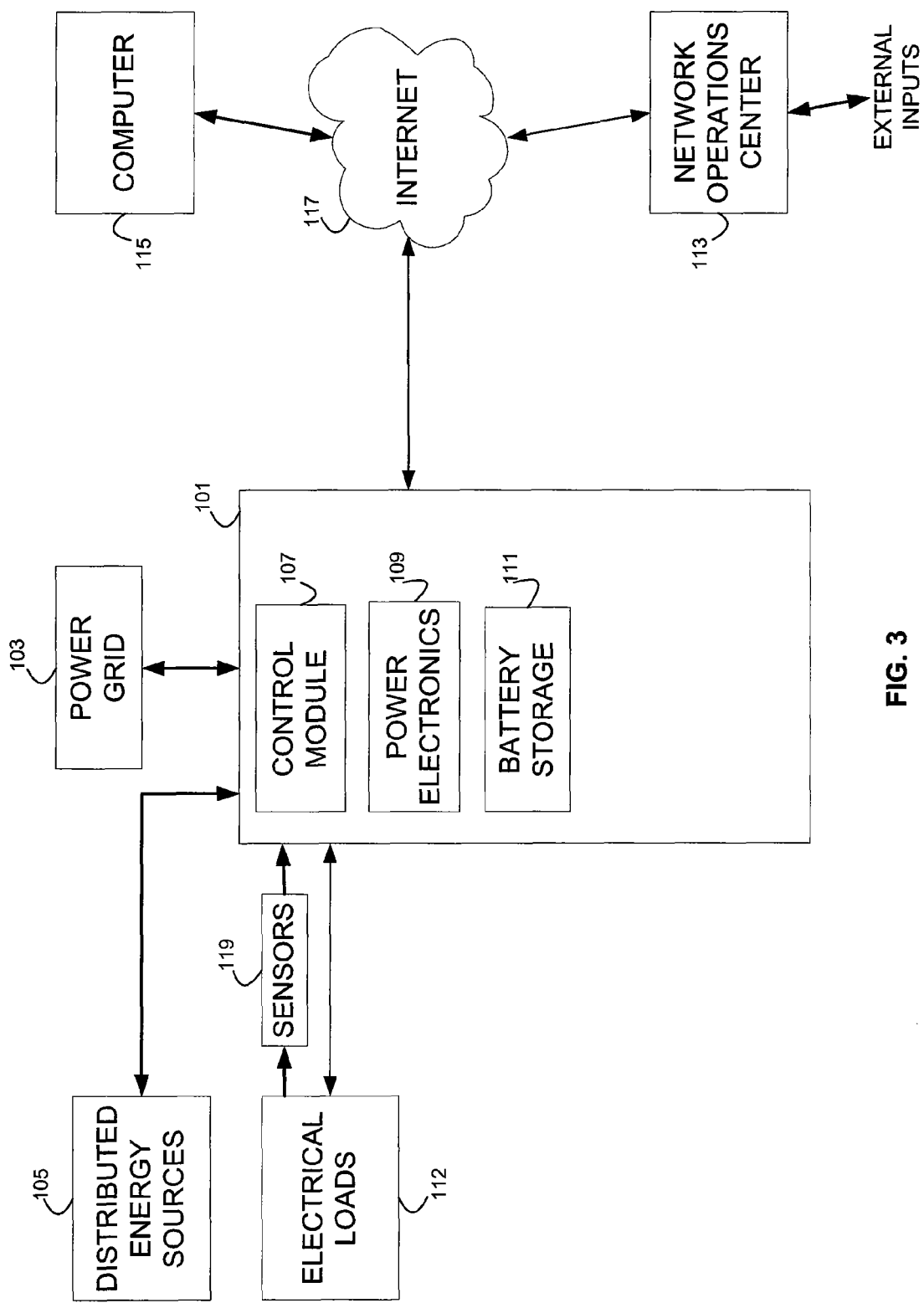
FIG. 3 is a schematic block diagram illustrating a system that may incorporate aspects of the invention.

FIG. 3 shows a system that may incorporate certain aspects of the invention. An energy management device 101 may be located at a customer's premises, e.g., home or business, and may be coupled to the power grid 103 and one or more distributed energy sources 105 (e.g., solar panels, wind turbine, fuel cell, electrical generator, etc.). The energy management device 101 may comprise various components such as a control module 107, power electronics 109, and battery storage 111. Battery storage may comprise, for example, a plurality (bank) of lead-acid, nickel-metal-hydride, nickel cadmium, lithium ion, vanadium redox or zinc bromide storage batteries for storing electrical energy. In addition to, or in lieu of, electro-chemical battery storage, electrical energy storage may be provided in another rechargeable form. This includes electromechanical storage devices such as flywheels, pumped hydro or compressed air storage devices, and electrostatic storage devices, such as large capacitors.

Energy management device 101 is coupled to the electrical utility power grid 103 through a power interface, which may include circuit breakers, surge suppressors and other electrical devices. Electricity may be supplied in various forms, such as 110 volts or 240 volts as commonly found in homes.

As explained in more detail herein, battery storage 111 may provide power to various devices (electrical loads 112) during times of electrical grid outages or during periods where electrical grid costs exceed certain thresholds and it may be used to sell power back to the electrical utility during times that are determined to be favorable. The storage capacity of battery storage 111 may be selected to suit a particular environment, such as the needs of a typical home residence, business, or other electrical consumer. The present invention has general applicability to energy storage devices of any type and capacity. The invention finds particularly useful application to storage devices for which the useful lifetime thereof can be estimated in terms of a discharge/charge cycle life and a time life, and which are suitable for serving as a source of back-up power for a home or business in the event of a grid power outage or curtailment.

The value of electrical energy storage technology is manifold: (1) storage provides emergency backup when supply from the grid is interrupted; (2) electrical energy storage buffers the difference between demand at an instant in the supply from variant sources like photovoltaics and wind, allowing them to be used when there is no grid connection; (3) storage extends the period of usefulness of technologies like solar and wind which show large variation in production over the course of the day; (4) where the cost of a supply varies over the course of the day (as in the case of time of rates) storage provides for shifting demand from times of high cost to times of low cost; (5) storage can provide for the mitigation of "demand charges" which are based on peak consumption, possibly to the extent necessary to move to a lower cost contract; and (6) in sufficient quantity (as from multiple units (100's or 1000's) energy for and from storage can be traded on the wholesale market allowing for a form of energy arbitraging.

In one variation, energy management device 101 may be of a type described in U.S. application Ser. No. 11/144,834, filed on Jun. 6, 2005 (entitled "Optimized Energy Management System"), hereby incorporated by reference, but the particular design of the device is not critical to the present invention. Commercially available units such as GridPoint CONNECT™ or GridPoint PROTECT™, available from GridPoint Inc., of Washington D.C., can be used for device 101.

Energy management device 101 controls the consumption of electrical power at the premises (e.g., customer's home or business location), and may also control the generation and storage of electrical energy. For example, device 101 may cause energy to be purchased from the power grid during off-peak hours and stored in battery storage 111, then tap into that energy during peak electrical demand periods to efficiently allocate energy usage over time and reduce overall electrical costs.

Device 101 is in turn coupled via a network such as the Internet to a network operations center (NOC) 113, and transmits measured power usage to NOC 113 periodically. One or more computers 115 may also be coupled via the Internet 117 or other means (e.g., direct connection to device 101) to perform configuration and monitoring as described in more detail below. The computer may be located at the customer's premises or at another location. Additionally, the NOC 113 can be located at the customer's premises or a remote location.

Although not shown in FIG. 3, device 101 may also periodically report the remaining charge of batteries 111, and the available or projected energy available from distributed energy sources 105 (e.g., solar cells) to NOC 113, such that NOC 113 can display these values on computer 115 along with other pertinent information. For example, a user could log in from the office to obtain a report regarding the available energy storage at the user's home. Energy sources 105 may include photovoltaic (PV) cells, which may be mounted on a roof of the home or business; micro-hydroelectric power generators, which generate power based on the movement of water; gas turbines; wind turbines; and fuel cells. Other sources may of course be provided.

The system illustrated in FIG. 3 may comprise a system as described in the present assignee's copending U.S. patent application Ser. No. 11/276,337, filed on Feb. 24, 2006, entitled "Energy Budget Manager," which is hereby incorporated by reference in its entirety. Such a system may implement a method of monitoring energy consumption including steps of establishing an energy budget for a future time period, receiving device information for a plurality of electrical devices and associating the device information with the energy budget, periodically measuring electrical usage from the plurality of electrical devices, such as through the use of sensors 119, projecting future energy consumption for the future time period based on the measured electrical usage, comparing the projected future energy consumption to the energy budget, and if the projected future energy consumption deviates from the energy budget, automatically generating an alert. The projected future energy consumption can take into account various factors such as energy available from non-grid sources; weather forecasts; battery storage; and historical data. A system employing the method can automatically control devices to bring predicted consumption within the budget.

Various aspects of the inventive energy management algorithms described herein may generally be executed in one or both of computer 115 and control module 107 shown in FIG. 1. For example, a scheduling process may be carried out with computer 115, and control module 107 may receive downloaded instructions from computer 115 to execute cycle control based on the schedule. It is not necessary to have a separate computer 115 and control module 107 in order to carry out the inventive processes, i.e., the respective functions could be carried out by a single device supplied with appropriate software and inputs.

The basic idea behind load-shifting is to buy energy off peak and sell it/use it on peak, effectively time-shifting energy use. The processes and apparatus of the present invention facilitate load-shifting in an effective manner that can be used to maximize cost savings. Set forth below are analyses, and exemplary load shifting strategies developed based on those analyses, in accordance with the present invention.

From the battery's perspective, one load-shifting event is a cycle and any load-shifting strategy can be viewed as a schedule of when and how to cycle the battery. It will be understood that unless otherwise indicated, references herein to a "battery" are intended to refer to rechargeable electrochemical electrical energy storage devices of all types, and to encompass plural batteries, e.g., a bank of batteries, such as may serve as a battery back-up. It will be understood that the invention has, in general, applicability to energy storage devices other than "batteries" as well.

Calculating Energy Bill Savings for a Cycle
Given the following definitions:
P—Price at peak;
O—Price off peak;
E—Round trip efficiency, i.e., the amount of energy recoverable from the battery storage as a percentage of the energy consumed to charge the battery storage;
K—Battery capacity; and
DoD—Depth of discharge (as a percentage of the full charge state of the battery).
Then, for one discharge/charge cycle:
Dollars Not Spent On Peak (running on battery) =P*K*DoD; and
Dollars Spent Off Peak (charging from the grid)=(1/E) *O*K*DoD.
Let $S_c$ be the dollar savings on the energy bill for cycling in this way. Then:
$S_c$=P*K*DoD−(1/E)*O*K*DoD=(P−(O/E)) K*DoD.
Examples
1. P=0.29, O=0.09, E=0.65, K=10, DoD=0.6, then $S_c$=(0.29−0.09/0.65)*10*0.6=0.90
2. P=0.12, O=0.09, E=0.65, K=10, DoD=0.6, then $S_c$=(0.12−0.09/0.65)*10*0.6=−0.11
3. P=0.39, O=0.19, E=0.65, K=10, DoD=0.6, then $S_c$=(0.39−0.19/0.65)*10*0.6=−0.59
4. P=0.58, O=0.18, E=0.65, K=10, DoD=0.6, then $S_c$=(0.58−0.18/0.65)*10*0.6=1.80.
Given the following definitions:
I—Initial cost of the Battery;
T—Expected Lifetime of the Battery (years);
R—Rated Cycles of the Battery (assume discharge down to the rated amount).
Let C be the Cost of a cycle; and
Let F be the Cycles per Year. (Cycling Frequency)
F is the measure of how frequently the battery is cycled in terms of charge and discharge cycles per year. Thus, load-shifting strategy in accordance with some embodiments of the invention will have a value for F equal to the number of days chosen to load-shift in a year.

A bank of batteries will typically be purchased as part of a battery backup system. Thus, the cycle cost may be determined based upon how much life the battery bank will lose due to cycling that it would have otherwise retained to provide backup power. Thus, if exactly the Rated Cycles of the Battery is cycled over the Expected Lifetime, the Cycling Frequency would be F=R/T, and the Cycle Cost would be 0 since the expected lifetime of the battery was not lowered. In fact, if the cycling was less frequent than R/T, the cycle cost would be defined to be 0, since the battery life is not reduced in this case (i.e., if F less than or equal to R/T, then C=0).

If all the rated cycles were to be used all at once the instant the battery was unpacked, F would approach infinity and the cost would be I/R, since then R cycles would have been used up in 0 time. (i.e., if F is infinite, then C=FR). If all the rated cycles are used in half the battery's expected lifetime, F would be set equal to twice the frequency needed to run through the rated cycles at the battery's rated lifetime and the cycle cost C would be expected to be ½ I/R (since it is necessary to replace the battery half way through its expected life).

In the above case, F=2R/T. Thus the formula for C is:
F R/T, then C=0;
F>R/T then C=(I/R)*(1−R/(T*F));
Case where F=R/T, then C=I/R*(1−R/(T*R/T))=I/R*(1−1)=0;
Case where F=Infinite, then C=I/R;
C=I/R*(1−R/Infinity)=I/R;
Case where F=2R/T, then C=I/R*(1−R/(T*2*R/T))=½I/R.

The Cost of a Cycle (Alternate Derivation)
Assume the following definitions:
R—Rated Cycle life of battery;
F—Cycles per Year;
T—Expected time to provide backup in years;
T'—The adjusted expected life of the batteries at the specified cycling frequency; and I—Initial cost of the batteries.

It can be assumed that customers are buying battery backup for a specified period of time T. Thus, if the life of the batteries is not reduced below T, no harm has been done (i.e. there was no "cost" to the action). If the battery life is reduced to some amount T'<T, the cost incurred includes the cost of the battery backup that was paid for but which the customer did not get: (1−T'/T)*I. The adjusted expected life of the batteries would be the Rated Cycle Life divided by the Cycles Per Year: T'=R/F. The batteries can be expected to expire before time T if the cycle life R is reached before then (F>R/T: batteries can be expected to expire before time T).

Assuming T' is less than T implies that a cost has been incurred, of:

$$(1-T'/T)*I=(1-(R/(F*T)))*I.$$

What has been described as a "cost" is really a reduction in the benefit the customer already paid for. If T'>T, this benefit would not have been reduced, since backup power was provided for T years. Dividing this evenly by the R cycles used implies a Cycle Cost C of:
C=(I/R)*(1−R/(F*T)) (regardless of what the cycles are used for). Thus:
If F<=R/T, then C=0 (no cycle cost);
If F>R/T, then C=(I/R)*(1−R/(F*T)).

Net Benefit
If N is defined as the net benefit, i.e., the benefit per year with load-shifting, accounting for the cost of a cycle on the life of the battery, then:

$$N=F*(S_c-C).$$

The goal of a load-shifting algorithm is generally to maximize net benefit N. There are only two variables, however, that a load-shifting algorithm has any control over: (1) how frequently the battery is cycled (i.e., F), and (2) the depth DoD to which the battery is cycled. The cases below illustrate how net benefit N changes with changes in the frequency of the cycling F.

Case 1: F>R/T, then F*($S_c$−C)=F$S_c$−FI/R+I/T=F($S_c$−I/R)+I/T, which is a line with a negative slope (for $S_c$<I/R) which only decreases as F increases. A way to think about this result is that there are R cycles at most to spend over the life of the battery, so the most that could ever be saved on an electrical bill is R*$S_c$. One can accelerate how quickly that happens, but that will mean decreasing the battery's expected life-span; and the energy bill savings due to the acceleration will not be paying for the life lost (unless $S_c$>I/R).

Case 2: F<R/T, then F*($S_c$−C)=F $S_c$<$S_c$R/T (as long as $S_c$ is positive) since F<R/T. If F<R/T then, while the cycle cost is still 0, the total number of cycles that can be performed over the battery's lifetime has decreased (since it won't be possible to use R cycles before the battery is expected to die). Thus, in this case, there is a decrease in the savings that could have been achieved over the battery's expected lifetime (R*$S_c$).

Case 3: F=R/T=>F*($S_c$−C)=$S_c$R/T. Since the longest battery life that can be expected to be achieved is the rated life T, and the greatest savings that can be achieved is R*$S_c$, both may be expected to be achieved when the cycle rate is R/T. The energy bill savings $S_c$ does not depend on cycling frequency. Thus, the benefit is maximized with R cycles and energy bill savings S, (saving R*$S_c$ dollars) providing a battery lifetime of T years. Unless the total energy bill savings were greater than the initial cost of the battery (R*$S_c$>I), it would be counter-productive to hasten the battery's demise by a single day.

Cycles Needed for Backup
Suppose Q cycles are needed by the battery to last T years providing backup. In this case, it would be assumed that the rated cycles R>=Q. Thus R−Q cycles (the unreserved cycles) can be used for other purposes because those cycles were bought for battery backup but are unnecessary to accomplish that task.

Cycle Budgets
It has been shown above that cycling at a frequency of R/T cycles per year maximizes Net Benefit. In accordance with an embodiment of the invention, an algorithm employs a budget of unreserved cycles each year for load-shifting. Using unreserved cycles for load shifting equal to ((R−Q)/T) plus the reserved cycles for backup equal to (Q/T)) in a year implies that the cycles per year F=R/T, which keeps the Cycle Cost (C) at 0 by using only the "Free Cycles" (F=R/T, then C=0). In accordance with one embodiment, the budgeted cycles will be put to use on the days of the year where the energy bill savings achieved per cycle S, is greatest (only when P−(O/E)>0). In accordance with an embodiment of the invention, an algorithm is employed to find the best days (highest savings $S_c$) to spend the unreserved cycles (R−Q) in a given year. In this embodiment, there is the caveat that a cycle will be spent only when P−(O/E)>0.

Implications of Using Cycle Budgets
As long as there is a rate active during the year where P−(O/E)>0, energy consumers employing a battery back-up can be provided with a cost benefit through load-shifting. The generally stated algorithm is optimal except in the hypothetical case of a rate that gives $S_c$>I/R, at which point it would become profitable to employ a bank of batteries solely for the purpose of load shifting, since at that savings rate the cycles would be paying for themselves, and then some. Generally, it would not pay for an energy consumer to invest in a battery bank solely for the purpose of load shifting; the inventive load shifting is primarily intended to give an added benefit to those consumers who desire/need a battery back-up for maintaining power in a power outage/shortage situation, or other purposes. The inventive techniques and apparatus provide an effective way to make advantageous use of otherwise unused excess cycles provided by a battery back-up.

To achieve the greatest savings, battery life should not be lowered (so long as S, <PR). If the cycling frequency is lowering the battery life, then the cost benefit is lower than it could be. This does not mean that it is necessary to use the Rated Cycle Life/DoD. As explained later, for any depth of discharge (DoD), an Expected Cycle Life may be determined.

The Split and Sort Algorithm

It has been shown above that one optimal load-shifting strategy is to determine a cycle budget for the specified battery characteristics and DoD, then apply the cycles within that budget to the most profitable days as determined by the rate, i.e., where P−(O/E) is highest. The algorithm described below determines the most profitable days to cycle for a given rate. The consumer can input the utility name and/or peak and off-peak electrical rates. These can alternatively be retrieved from a database based on the consumer's zip code, for example. The consumer can also provide historical usage data based on previous utility bills, for use in estimating a baseline energy usage level, i.e., an expected level of energy consumption apart from the effect of any load shifting. Alternatively, this data could be downloaded from the utility based on the user's account number (not shown) or other data.

Rate schedules specify what a utility charges its customers for the energy they use. Rate schedules are often divided into "seasons" (e.g. summer and winter) where one set of $/kWh costs apply during the months covered in one season and another set of costs apply during another season. Within a season, rate schedules may specify a different $/kWh cost for energy used during one time of day than another time of day e.g. Peak time vs Non-Peak time. This is called Time of Use or Time of Day pricing. Weekends and Holidays are often excluded from price variations based of time of use (usually these are charged at the "Off Peak" price).

Within a season, rate schedules may specify a different $/kWh cost for consumption over a certain amount within a billing cycle. Such pricing mechanisms are sometimes called Season tiers. Generally speaking, these work like marginal income tax rates e.g. the first 1000 kWh used are charged at $X/kWh, the next 1000 kWh used may be charged at $Y/kWh, and anything over that may be charged at $Z/kWh. Often times pricing tiers are used to incent customers to use less energy by charging more per kWh for consumption above a certain 'baseline' level. Other times pricing tiers act like a bulk discount where kWh become cheaper when more are used. Aspects of the invention take into account such rate schedule structures in connection with determining the most profitable days for load shifting, and in allocating the limited number of cycles available for load shifting to those days.

In accordance with an aspect of the invention, a time period, such as a year long period, is divided up into billing cycles, and for each division the following are recorded:

1) the baseline energy usage level, i.e., the energy expected to be used by the consumer in the division absent load shifting;

2) the number and upper boundary of the tier that the expected usage falls into (infinity if there are no tiers). The exemplary embodiment considers the case where a billing cycle can be assigned exactly one season. If the utility proportionally bills when billing cycles cross seasons, this may be accounted for as well, with additional appropriate computations;

3) the quantity P−(O/E) as determined by peak and off peak prices and the tier the recorded expected usage fell into (P and O generally remain constant within a given season and tier); and 4) the number of cyclable days within the division (since weekends and holidays usually do not have peak and off peak periods they are not cyclable). In practice this is often the same as 'business days'.

A hypothetical example of a collection of data as specified in 1-4 above, for a calendar year, is provided below.

| Start Date | End Date | Peak | Off Peak | P-(O/E) | Cyclable Days | Expected kWh | Tier | Tier Bound |
|---|---|---|---|---|---|---|---|---|
| Jan. 1, 2006 | Jan. 31, 2006 | $0.30 | $0.20 | ($0.01) | 21 | 1312 | 3 | 1500 |
| Jan. 31, 2006 | Mar. 3, 2006 | $0.25 | $0.15 | $0.02 | 23 | 626 | 2 | 1000 |
| Mar. 3, 2006 | Apr. 3, 2006 | $0.25 | $0.15 | $0.02 | 21 | 775 | 2 | 1000 |
| Apr. 3, 2006 | May 4, 2006 | $0.25 | $0.15 | $0.02 | 23 | 778 | 2 | 1000 |
| May 4, 2006 | Jun. 1, 2006 | $0.39 | $0.14 | $0.18 | 20 | 365 | 1 | 600 |
| Jun. 1, 2006 | Jul. 2, 2006 | $0.39 | $0.14 | $0.18 | 22 | 339 | 1 | 600 |
| Jul. 2, 2006 | Aug. 6, 2006 | $0.74 | $0.49 | ($0.01) | 25 | 2578 | 4 | 99999 |
| Aug. 6, 2006 | Sep. 2, 2006 | $0.74 | $0.49 | ($0.01) | 20 | 3787 | 4 | 99999 |
| Sep. 2, 2006 | Oct. 1, 2006 | $0.40 | $0.30 | ($0.06) | 20 | 5860 | 4 | 99999 |
| Oct. 1, 2006 | Nov. 2, 2006 | $0.40 | $0.30 | ($0.06) | 23 | 5090 | 4 | 99999 |
| Nov. 2, 2006 | Dec. 2, 2006 | $0.40 | $0.30 | ($0.06) | 22 | 3376 | 4 | 99999 |
| Dec. 2, 2006 | Jan. 1, 2007 | $0.25 | $0.15 | $0.02 | 20 | 466 | 2 | 1000 |

A "tier splitting" aspect of the "split and sort" algorithm, that may be used if the rate schedule employs usage-based tiers, is now described. Due to the efficiency loss involved in purchasing and storing energy to dispatch in the future $(1/E)*K*DoD$ units of energy must be purchased and stored in order to dispatch $K*DoD$ units of energy on demand. Thus $(1/E-1)*K*DoD$ units of energy represents the extra energy consumed with every complete load shifting cycle. If X is the expected usage for the billing cycle without load shifting and T>X is the energy that could be used in the billing cycle before crossing into the next Tier, then $\text{Floor}[(T-X)/((DoD*K)((1/E)-1))]$ is the integer number of load shifting cycles (Y) that can be performed before the total energy consumed during a billing cycle crosses into the next higher tier.

For each billing cycle division, the formula above $(Y=\text{Floor}[(T-X)/((DoD*K)((1/E)-1))])$ is used to "split" the divisions generated such that the benefit per kWh shifted (PO/E) in each division reflects the additional costs that the additional energy consumed by load shifting would incur by pushing the consumption within the billing cycle into a higher tier:

1) For Each Billing Cycle Division:
   1.1) Calculate Y (Cyclable Days that can be used for load shifting before pushing into the next tier for the current Division, using the formula previously indicated).
   1.2) If (Y=0) (this would occur when the expected usage is at or very near a tier boundary, i.e., the expected usage plus the extra usage from one load shift cycle would put the resulting usage over the tier boundary) then:
      1.2.1) Add 1 to the Tier and update the Tier Boundary
      1.2.2) Continue calculating with this same Division by going back to 1.1

1.3) Else If (Y<Cyclable Days) then:
1.3.1) Split the current Division into two new divisions, Division 1 and Division 2, copying the contents from the original division into the two new ones.
1.3.2) Set the Cyclable Days in Division 1 to Y. Set the End Date of Division 1 to the end of the Y'th Cyclable Day of the original division.
1.3.3) Subtract Y from the Cyclable Days in Division 2. Set the Start Date of Division 2 to the end date of Division 1.
1.3.4) Add the quantity $Y*DOD*K*(1/E-1)$ to the Expected Usage for Division 2.
1.3.5) Add 1 to the Tier for Division 2 and set the Tier boundary to the upper bound of the next higher Tier.
1.3.6) Update $P-(O/E)$ for Division 2 for the costs implied by the new Tier.
1.3.7) Division 1 requires no further splitting. Continue calculating with Division 2 by going to 1.1.
1.4) Else (Y>=Cyclable Days).
1.4.1) The current division needs no further splitting. Move on to the next Billing cycle by going back to 1. Next, order the intervals by the qty $(P-(O/E))$ (values appearing in parentheses are negative; tier bound of "99999" indicates no bound):

The next step is to allocate load shifting cycles to the days in the identified intervals, from the top down, until the budget is used up or there are no further profitable intervals. In order to compute the net benefit of applying the cycle budget for a year, the $SUM((P_i-(O_i/E)) DoD*K)$ over all the i cycles determined by the algorithm can be computed. The benefit would be computed by summing over each load shifting cycle the value of $(P-(O/E)) DoD*K$ where an individual cycle's $P-(O/E)$ value was recorded with the division the cycle was chosen from If there are not enough profitable days within the year to use up the cycle budget, the cycle budget can be decreased by increasing the Depth of Discharge (DoD). Since the DoD can be changed, it is possible to choose a larger DoD, at the cost of reducing the number of cycles in the cycle budget. In this manner, larger cycles can be applied to the most profitable days. Greater net savings can then be realized since the lost cycles would not be expected to have been used in any event. In an aspect of the invention, the algorithm described above will be re-run at different depths of discharge (and corresponding cycle budgets) to see which one maximizes the return for a particular user.

| Start Date | End Date | Peak | Off Peak | P-0/E | Cyclable Days | Expected kWh | Tier | Tier Bound |
|---|---|---|---|---|---|---|---|---|
| Jun. 1, 2006 | Jun. 9, 2006 | $0.39 | $0.14 | $0.18 | 6 | 339 | 1 | 600 |
| May 4, 2006 | May 12, 2006 | $0.39 | $0.14 | $0.18 | 6 | 365 | 1 | 600 |
| May 12, 2006 | May 16, 2006 | $0.54 | $0.29 | $0.09 | 2 | 591.15 | 2 | 700 |
| Jun. 9, 2006 | Jun. 14, 2006 | $0.54 | $0.29 | $0.09 | 3 | 565.15 | 2 | 700 |
| May 16, 2006 | May 24, 2006 | $0.64 | $0.39 | $0.04 | 6 | 666.54 | 3 | 900 |
| Jun. 14, 2006 | Jun. 21, 2006 | $0.64 | $0.39 | $0.04 | 5 | 678.23 | 3 | 900 |
| Dec. 2, 2006 | Dec. 22, 2006 | $0.25 | $0.15 | $0.02 | 14 | 466 | 2 | 1000 |
| Jan. 31, 2006 | Feb. 11, 2006 | $0.25 | $0.15 | $0.02 | 9 | 626 | 2 | 1000 |
| Mar. 3, 2006 | Mar. 10, 2006 | $0.25 | $0.15 | $0.02 | 5 | 775 | 2 | 1000 |
| Apr. 3, 2006 | Apr. 8, 2006 | $0.25 | $0.15 | $0.02 | 5 | 778 | 5 | 1000 |
| Feb. 11, 2006 | Mar. 3, 2006 | $0.30 | $0.20 | ($0.01) | 14 | 965.23 | 3 | 1500 |
| Mar. 10, 2006 | Mar. 30, 2006 | $0.30 | $0.20 | ($0.01) | 14 | 963.46 | 3 | 1500 |
| Dec. 22, 2006 | Jan. 1, 2007 | $0.30 | $0.20 | ($0.01) | 6 | 993.69 | 3 | 1500 |
| Jan. 1, 2006 | Jan. 6, 2006 | $0.30 | $0.20 | ($0.01) | 4 | 1312 | 3 | 1500 |
| Apr. 8, 2006 | Apr. 28, 2006 | $0.30 | $0.20 | ($0.01) | 14 | 966.46 | 3 | 1500 |
| Aug. 6, 2006 | Sep. 2, 2006 | $0.74 | $0.49 | ($0.01) | 20 | 3787 | 4 | 99999 |
| Jul. 2, 2006 | Aug. 6, 2006 | $0.74 | $0.49 | ($0.01) | 25 | 2578 | 4 | 99999 |
| May 24, 2006 | Jun. 1, 2006 | $0.74 | $0.49 | ($0.01) | 6 | 892.69 | 4 | 99999 |
| Jun. 21, 2006 | Jul. 2, 2006 | $0.74 | $0.49 | ($0.01) | 8 | 866.69 | 4 | 99999 |
| Apr. 28, 2006 | May 4, 2006 | $0.40 | $0.30 | ($0.06) | 4 | 1494.15 | 4 | 99999 |
| Oct. 1, 2006 | Nov. 2, 2006 | $0.40 | $0.30 | ($0.06) | 23 | 5090 | 4 | 99999 |
| Sep. 2, 2006 | Oct. 1, 2006 | $0.40 | $0.30 | ($0.06) | 20 | 5860 | 4 | 99999 |
| Nov. 2, 2006 | Dec. 2, 2006 | $0.40 | $0.30 | ($0.06) | 22 | 3376 | 4 | 99999 |
| Mar. 30, 2006 | Apr. 3, 2006 | $0.40 | $0.30 | ($0.06) | 2 | 1491.15 | 4 | 99999 |
| Jan. 6, 2006 | Jan. 31, 2006 | $0.40 | $0.30 | ($0.06) | 17 | 1462.77 | 4 | 99999 |

50

Figure 4:
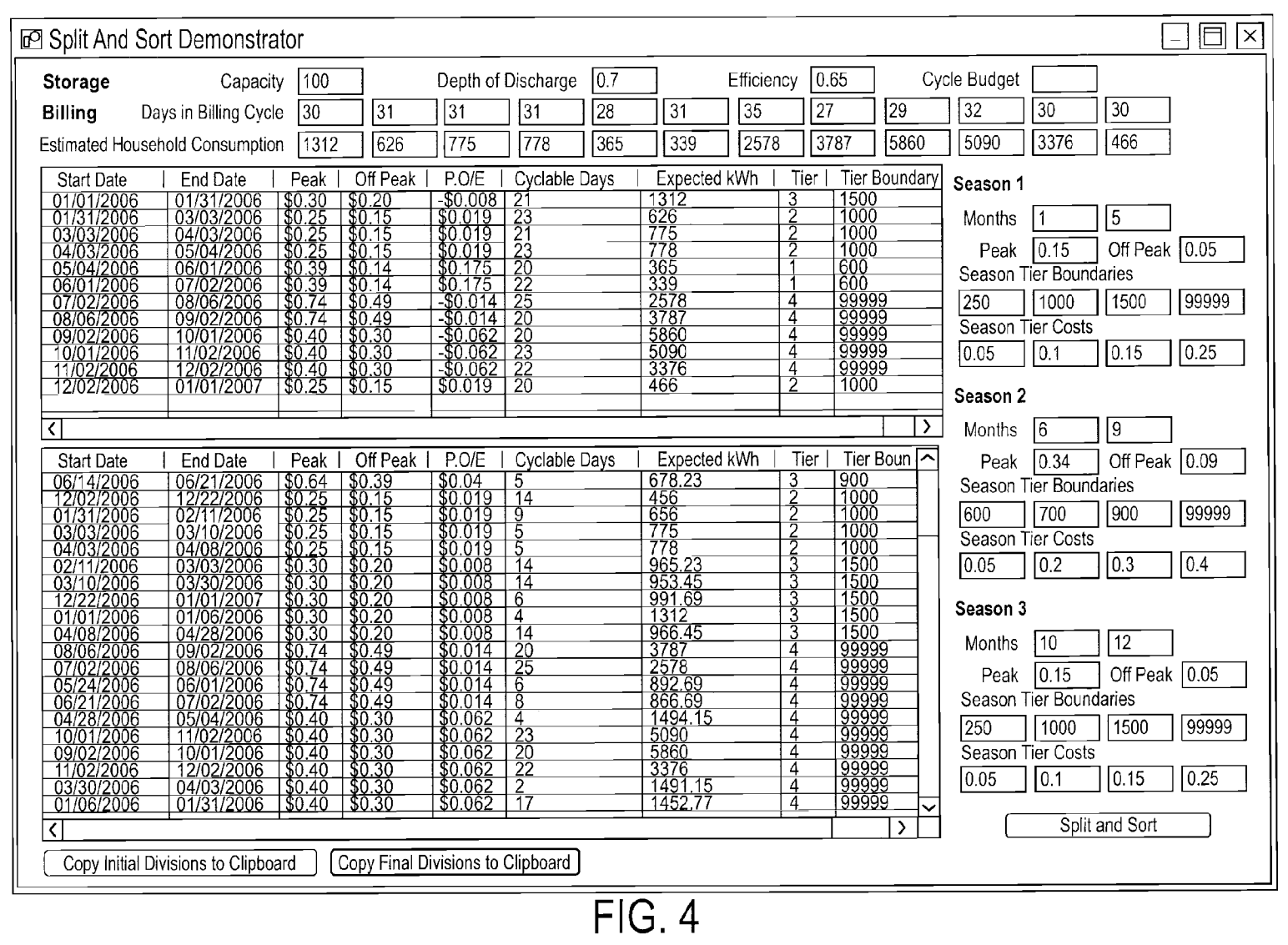

FIG. 4 is an illustrative screenshot taken from a Split-and-Sort demonstrator application. This exemplary graphical user interface (GUI) takes as inputs the battery capacity, depth of discharge, round trip efficiency, billing cycle information, and expected baseline use estimates for each billing cycle (expected usage absent loadshifting). Each of these items are input in the boxes provided along the top of the window. Along the right side of the window, input boxes are provided for input of rate information by season, including usage-based tier information. Season tier charges are added to base Peak and Off Peak charges to get the applicable $/kWh charge. After inputting all the required information, a user may click the 'Split and Sort' button, whereupon the input data is collected and suitable calculations are performed, and the data set forth in the previous two tables is presented as tabular outputs in the window.

Battery owners will typically use their batteries for purposes other than load-shifting, e.g., for emergency back-up in the case of a power outage. These other uses can have an effect on the cycle budget. A simple dynamic modification to the disclosed algorithm can take this effect into account. If a box owner uses a cycle for say, a power outage or curtailment event, that cycle would be subtracted from the cycle budget, and the least profitable cycle remaining in the year's load shifting schedule could then be dropped.

Cycle life at any DoD

Given knowledge of cycle life of a battery for two different depths of discharge, one may determine the cycle life for any depth of discharge.

Let:

$R1$=Cycle Life at DoD $D1$;
$R2$=Cycle Life at DoD $D2$; and
$R$=The Cycle Life at some arbitrary DoD.

Then:

$m = (\ln(R1/R2)/D1) \cdot (D1/(D1-D2))$.

$R0 = R1/e^{(m \cdot D1)}$; and $R = R0 \cdot e^{(m \cdot DoD)}$.

The variables m and R0 are fixed characteristics of the battery. R0 is positive, m is negative. For an exemplary battery with the following table of Cycle Life to DoD, m=−2.5 and R0=5425.175:

| DoD | Cycle Life |
|---|---|
| 0.1 | 4200.023653 |
| 0.2 | 3251.544639 |
| 0.3 | 2517.257857 |
| 0.4 | 1948.792903 |
| 0.5 | 1508.702722 |
| 0.6 | 1167.996814 |
| 0.7 | 904.2315219 |
| 0.8 | 700.0315713 |

In accordance with one embodiment of the invention, a process executes charge, discharge and hold intervals based upon a schedule established as described above, to maximize energy cost savings through load shifting. This process, which may be carried out under the control of a suitably programmed computer (e.g., control module 107), will parse an established schedule of charge, discharge and maintain intervals, determine which of the three states is the current state based on the time and date, and send the appropriate control messages to a set points gatekeeper, e.g., an inverter provided as part of power electronics 109. While in the exemplary embodiment described, maximum energy cost savings are the end result sought, the invention is not so strictly limited. It is envisioned that other considerations may dictate departure from an optimal maximum savings schedule, while nonetheless employing the principles of the invention.

Three exemplary approaches for implementing a discharge interval are as follows: attempting to discharge down to the selected depth of discharge as soon as possible after the discharge directive is issued, e.g., at the start of the peak rate period; attempting to smoothly discharge down to the selected depth of discharge evenly over the discharge interval; and attempting to wait as long as possible prior to discharging the battery during the discharge interval. Considerations in regard to selection of a discharge strategy include whether in the particular installation the electricity is net metered such that electricity may be sold back to the grid. If it can be, discharging at the highest possible rate is desirable as any excess electricity that cannot be consumed at the premises will be sold back to the grid. Discharging quickly may be more efficient than discharging slowly. While rapid discharge is less efficient from the perspective of the battery, the faster the battery is discharged the less time the inverter (used to perform the DC to AC conversion) will be running, thus introducing additional inefficiency. Another consideration is the manner in which the state of charge (SoC), or conversely the depth of discharge (DoD), will be monitored. In one possible approach, a SoC may be converted to a voltage and monitored to detect when the battery has been discharged down to a target SoC (or DoD). Alternatively, or in addition, a SoC or DoD may be inferred from a counting of kilowatthours expended from a full or preset charge level.

Discharging—A Simple Implementation

For this implementation, it is assumed that net metering is applicable, such that power discharged from the battery in excess of the demands at the premises may be sold back to the grid. It is further assumed that it is not necessary to maximize uninterrupted power supply (UPS) availability by strictly minimizing all periods during which the battery bank will not be available as back-up, due to being discharged to the DoD. Under these assumptions, the battery bank may be discharged at the maximum rate of current flow starting at the beginning of the peak rate period. Of course, other schemes are possible, such as smoothly discharging the battery bank over the peak rate period. This would have the advantage of increasing the UPS availability, by increasing the period prior to which the battery bank is discharged down to its DoD.

The linear relationship that exists between the battery terminal voltage and the state of charge (SoC) when the current to or from the battery is low or zero (and in a steady state) can be used to compute a voltage corresponding to the target DoD. The system may employ a known-type feedback controlled inverter suitable for controlling the charging and discharging of a battery bank based upon set points, e.g., the GVFX 3648 inverter available from Outback Power Systems Inc. of Arlington, Wash. ("Outback"). With such an inverter unit, it is possible to accurately convert a target SoC (or DoD=1−SoC) to a target voltage, as the current draw by the inverter is controlled to taper 0 (open circuit condition) as the target DoD is approached. Thus, if: the voltage corresponding to the target depth of discharge is calculated in advance, the inverter is directed to discharge whenever battery voltage is above the computed voltage, and the inverter tapers off discharge current as the difference between target voltage and measured voltage gets small, the appropriate amount of energy for reaching the target SoC will end up being discharged from the battery.

In one exemplary embodiment (a bank of four 12 volt absorbed glass material (AGM) lead-acid batteries connected in series to provide a 48V nomimal battery, the 100% SoC is reflected by 2.14V per cell (open circuit=0 amp draw) and 20% SoC is reflected by 2.00V per cell. Thus "full" for this battery bank is 51.36V, and 20% SoC (1−DoD) is 48V. Hence, the linear relationship between state of charge (SoC) and open circuit voltage is:

$$SoC = 0.238V - 11.22; \text{ and}$$

$$V = (SoC + 11.22)/0.238 (0 <= SoC <= 1).$$

During the discharge interval, a set point of the inverter is set to disable the charge functionality thereof. Once the target voltage has been computed, an inverter set point SellRE, which is a voltage set point down to which the inverter will discharge electrical power to the grid, may be set to the target voltage corresponding to the target DoD. Control may then simply wait until the end of the interval, i.e., until DoD is reached, to terminate the discharge interval. Alternatively, the number of kWh needed to discharge in order to deplete the battery from its current state of charge to the destination depth of discharge may be pre-computed. SellRE is then set to its minimum value (around 42V) which has the effect of causing the inverter to discharge at the highest possible rate (30 amps or 3.6 kW AC). While it is discharging, the number of watthours discharged is counted until the pre-computed number is reached. Then, control transitions to the Maintain stage (described below). In cases where it is not possible to actually sell power back to the grid, e.g., by running the meter in reverse, the discharged power may nonetheless be used to satisfy the demands at the premises during peak periods. The household consumption requirements may be monitored, and if it got too close to zero, e.g., household appliances are consuming less power than the power being supplied by the discharge, the discharge could be throttled back.

In some "off-the-shelf" inverters, such as the Outback inverter previously mentioned, there may be a fixed lower limit to the refloat set point, which automatically initiates a charge from the grid when the charge level of the battery falls below the fixed lower limit, effectively overriding a SellRE set point set at a DoD which is below the limit. Preferably, for purposes of carrying out aspects of the invention, suitable modifications are made to the inverter (by the manufacturer or otherwise) as may be required to remove any such fixed lower limit.

Maintain—A Simple Implementation

"Maintain" refers to maintaining the battery bank in its current state of charge, neither discharging further nor charging from the grid on a scheduled load shifting day. In accordance with one embodiment of the invention, the battery bank is held in its discharged state (discharged to the specified DoD) following the above-described discharging process, and until the interval during which off-peak usage rates are applicable. In order to do this using the Outback feedback controlled inverter previously mentioned, or similar devices, the inverter set points are set to disable the charge functionality thereof (as in the discharge interval). The set point SellRE is maintained at the target voltage corresponding to the target DoD. As a result, in the event the system employing the inventive load shifting techniques is also equipped with an alternative energy source, such as photovoltaic cells (solar panels), which may generate electricity, any electricity generated during the maintain interval will effectively be passed through, i.e., sold back to the grid, rather than being used to charge the batteries.

Charging

Following the "maintaining" period, charging of the battery bank is initiated within the off-peak hours. With the Outback inverter, this is may be accomplished by:

1) undoing the changes to the SellRE Setpoint. (This will in general mean setting it back to 52 volts which corresponds to a full bank of batteries);
2) re-enabling the charger;
3) Initiating what Outback terms a "Bulk Charge" which will cause the inverter to charge the battery at full speed (20 amps) until the battery voltage measures 56 volts, and then hold the voltage there for two hours.

Normal Operation

"Normal operation" refers to the normal operation of the system used to maintain the battery back-up by charging it from the grid, or from solar or other sources of energy, and for controlling the provision of power in the event of a power outage or curtailment event, i.e., normal uninterruptible power supply (UPS) behavior. Normal operation takes place on days not scheduled for load shifting, and following Charging on a load shifting day. In addition, normal operation may be caused to occur on a load shifting day in which a power loss or curtailment occurs. In such a case, the system may be configured to interrupt/terminate the load shifting routine and return to normal UPS operation so as to permit a draw of electrical power from the battery back-up. With the Outback inverter that may be used in such a system, when the battery voltage equals the voltage specified by a "re-float" setting, an automatic battery charge is triggered. This charge lasts at least a set number of hours. When the inverter is charging the batteries, no selling occurs. When the battery is not charging and the battery voltage is above SellRE the battery is discharged at a rate that is highest when battery voltage and SellRE are several volts apart (30 amps/3.6 kW AC) and goes to 0 amps as Battery Voltage approaches SellRE. During normal operation according to one embodiment, SellRE is always maintained above ReFloat to avoid placing the inverter into a loop of constantly charging, then discharging, then charging again. This approach may be used to avoid charging during the Discharge and Maintain stages, in lieu of the above-described use of a set point that disables the charger entirely for the duration of the Discharge and Maintain intervals.

During "normal operation" in accordance with one embodiment, the set point ReFloat is set to a voltage correspondent to the batteries being 85-90% full (50.8-51.2 V). Thus, when the battery voltage drifts down to Re Float (because of tare losses or self discharge) the battery will automatically recharge. SellRe during this period of normal operation may be set, e.g., to 52 Volts. Thus, when the battery is not full and photovoltaic (PV) or other renewable electrical energy is coming in, that energy will be used to charge the battery. However if the battery is already full (52V), the excess will be passed through the inverter to satisfy the energy demands at the premises, and/or potentially sold back to the grid.

Processes in accordance with embodiments of the invention are now described, with reference to the flow charts of FIGS. 5A-7.

Figure 5A:
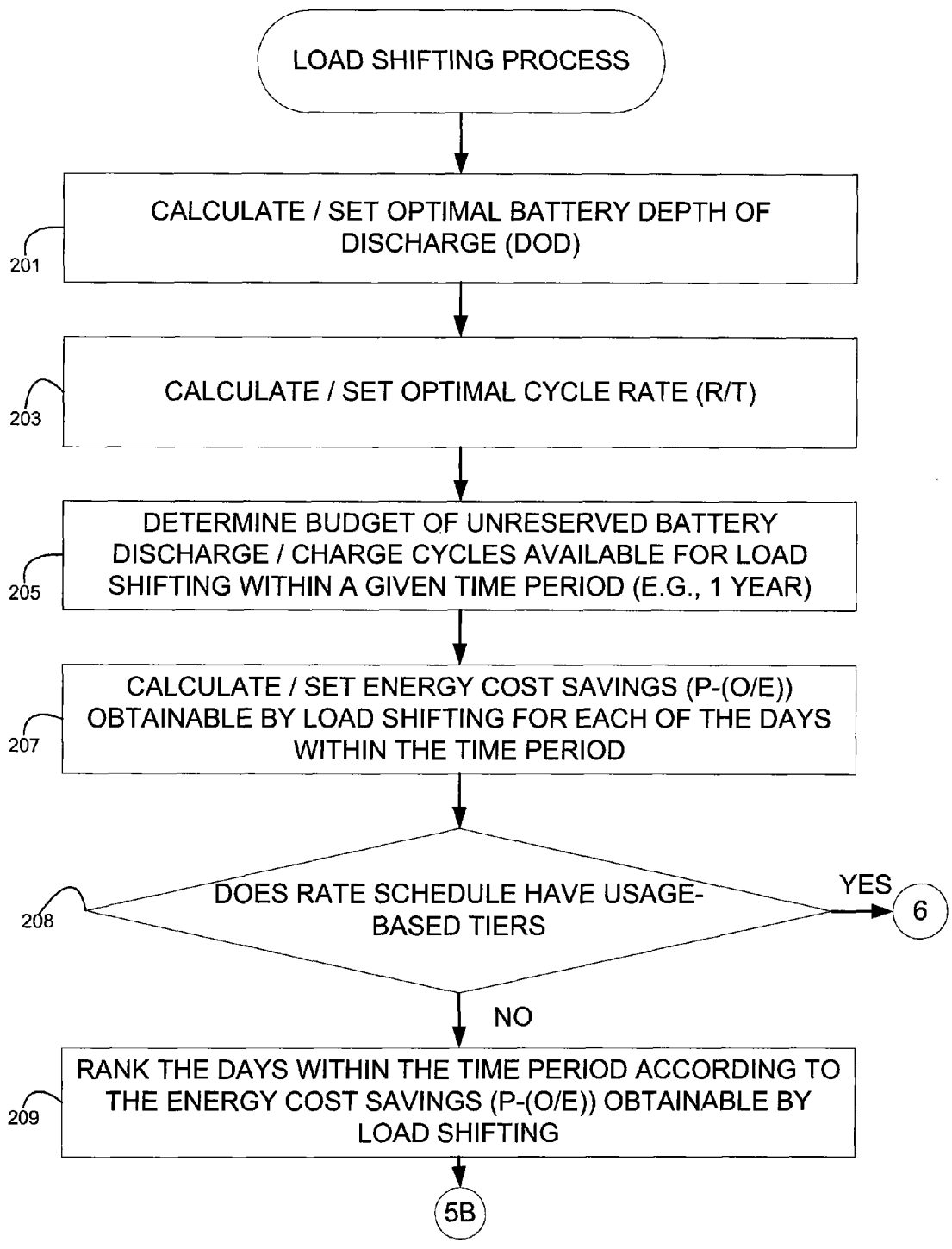
FIG. 5A is a flow chart illustrating a load shifting process in accordance with an aspect of the present invention.
Figure 5B:
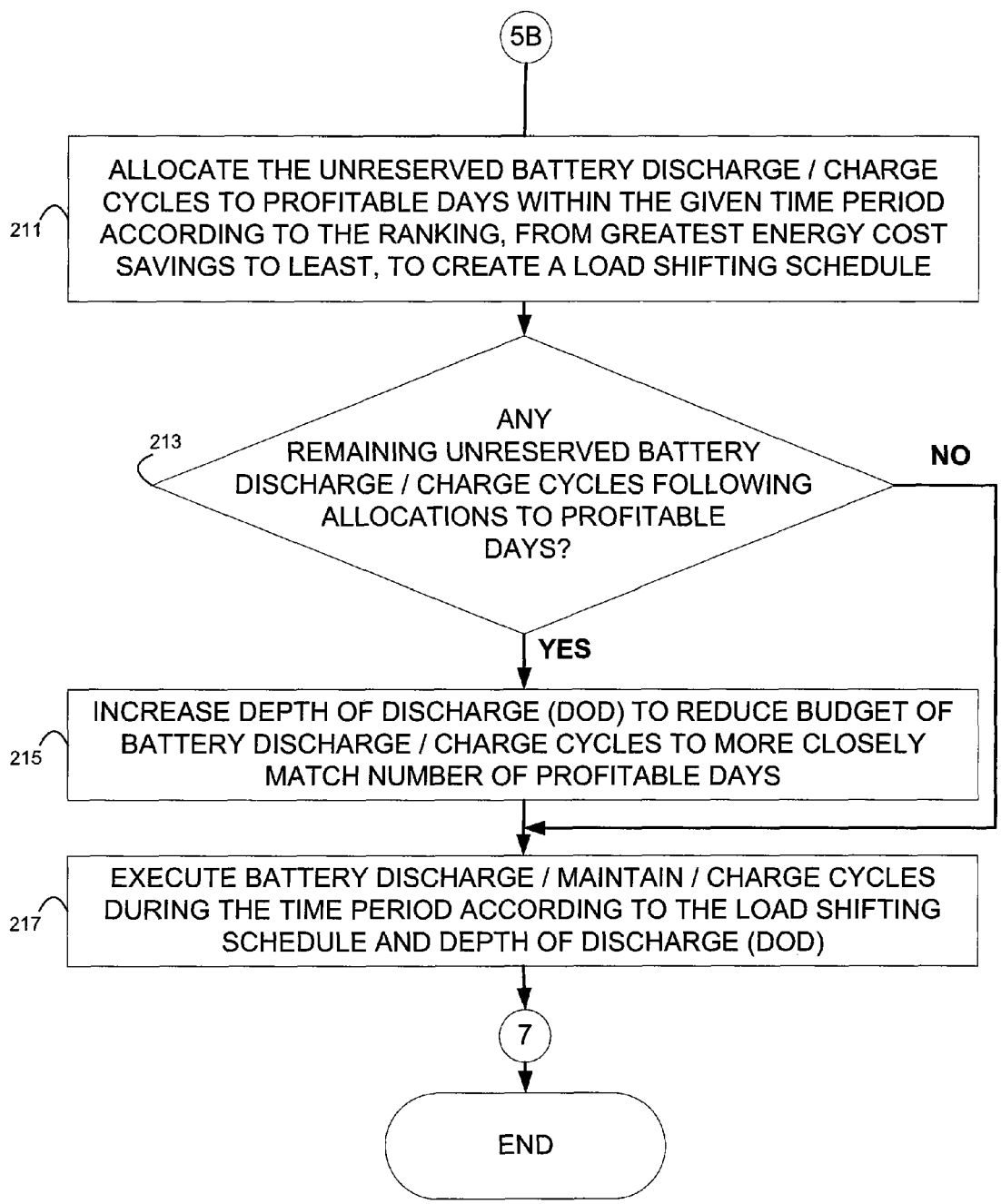
FIG. 5B is a continuation of the load shifting process flow chart of FIG. 5A.

Referring first to FIGS. 5A-5B, illustrated is a load shifting process in accordance with an aspect of the invention. In step 201, a battery depth of discharge (DoD) is set (and calculated or determined, as may be necessary). Next, in step 203, an optimal rate for carrying out load shifting discharge/charge cycles is calculated and set. This rate, which may be set to equal the rated cycle life (R) of the battery or another estimate of expected cycle lifetime for a particular DoD, divided by its rated or estimated useful time life (T), may be precalculated or determined, in which case it would only be necessary to set the rate at the time of system set-up. As previously explained, in order to maximize the net benefit from load shifting, the cycle budget should be set so as not to shorten the time life of the battery.

Next, in step 205, the budget of unreserved battery discharge/charge cycles available for load shifting within a given time period is determined. This time period may be, e.g., a one year time period. In step 207, the energy cost savings obtainable by load shifting on each of the days within the time period is calculated/set. As previously described, the energy cost savings per unit of energy shifted in a single load shifting cycle may be calculated as the value (P−(0/E)). In step 208, it is determined whether the rate schedule has usage-based tiers. If it does, the process proceeds with the previously described "tier splitting" algorithm, which will be further described in connection with FIGS. 6A and 6B. Otherwise, control proceeds to step 209, wherein the days within the given time period are ranked according to the energy cost savings (P−(0/E)) obtainable by load shifting. The "Split and Sort" algorithm thus provides an efficient mechanism for calculating (P−(0/E)) and ranking the days of the year (or any arbitrary time period) available for load shifting, from most profitable to least profitable. Then, in step 211, the unreserved battery discharge/charge cycles are allocated to profitable days within the given time period according to the ranking, from greatest energy cost savings to least, to create a load-shifting schedule.

Following the allocation of step 211, it may be determined, in step 213, whether there are any remaining unreserved battery discharge/charge cycles. If so, the DoD may be increased to obtain a greater degree of load shifting during off-peak hours, while reducing the budget of battery discharge/charge cycles to more closely match the number of profitable days for load shifting (step 215). If the determination in step 213 is no, step 215 is skipped. The process then proceeds to step 217, in which battery discharge/maintain/charge cycles are executed during the time period, according to the load shifting schedule and the DoD. This execution phase is illustrated in greater detail in FIG. 7 (to be described).

Figure 6A:
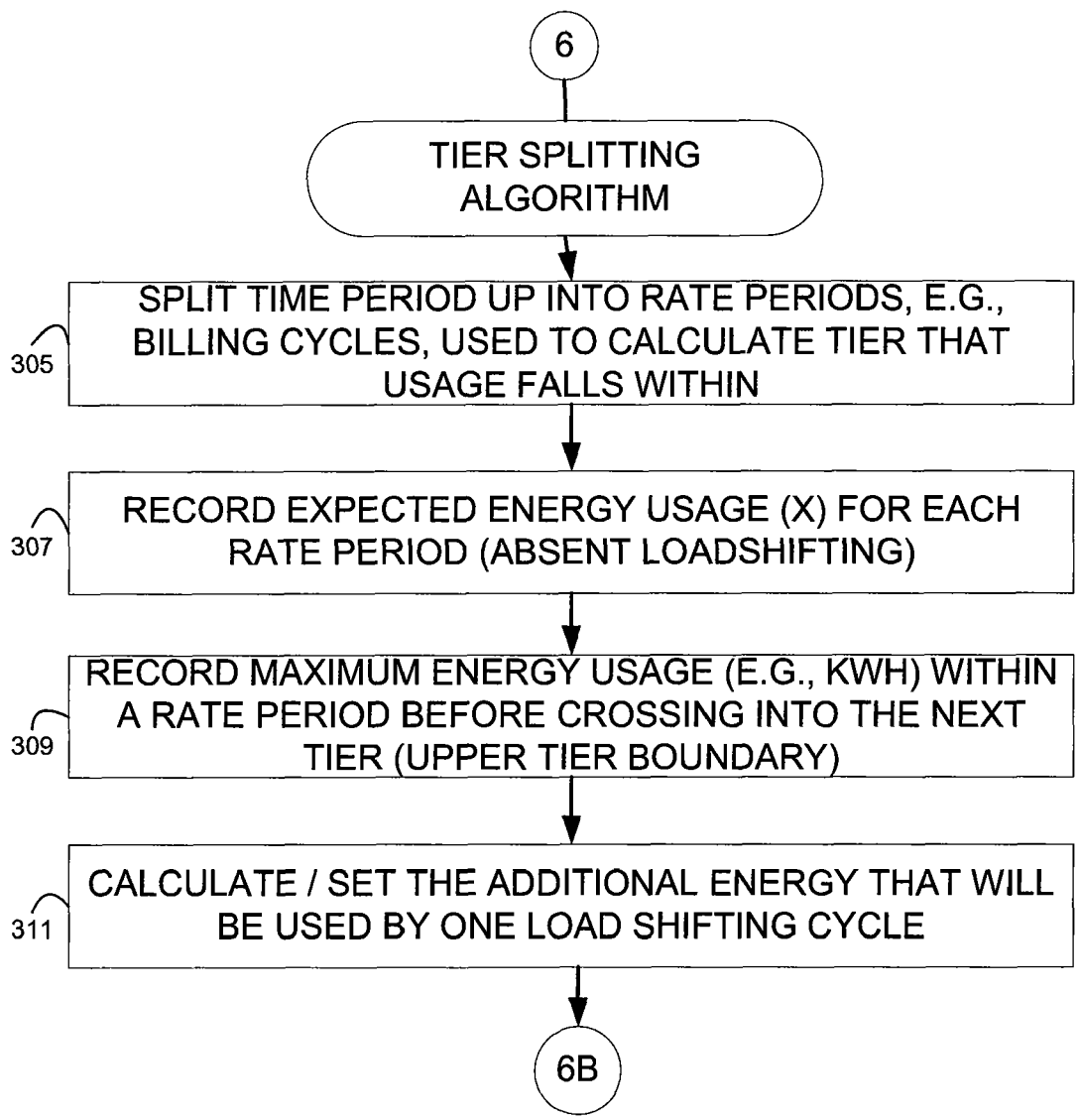
FIG. 6A is a flow chart illustrating a "split and sort" algorithm in accordance with an aspect of the invention, and forming sub-part of the load shifting process illustrated in FIGS. 5A-5B.
Figure 6B:
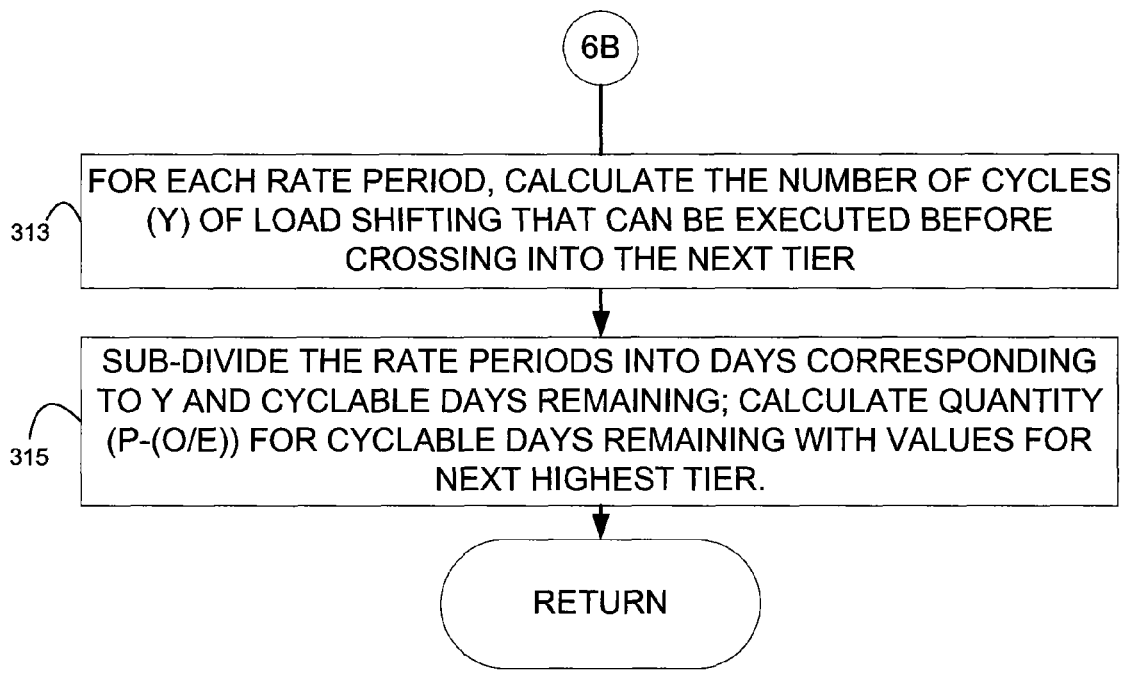
FIG. 6B is a continuation of the "split and sort" algorithm flow chart of FIG. 6A.

The tier splitting aspect of the "split and sort" algorithm is now further described with reference to FIGS. 6A and 6B. In step 305, the year is split up into rate periods, e.g., a billing month, used to calculate the tier that the energy usage falls within. Next, in step 307, an expected energy usage (X) before accounting for any load shifting is recorded for each rate period. In step 309, the upper tier boundary, i.e., the maximum usage, e.g., kilowatt hours, within a rate period before crossing into the next tier, is recorded. Next, in step 311, the additional energy that will be used by a load shifting cycle is calculated and set (or simply set if precalculated).

In step 313, the number of cycles (Y) of load shifting that can be executed before crossing into the next tier is calculated for each rate period, in the manner previously described. Next, in step 315, the rate periods are sub-divided into days corresponding to Y, and days remaining (if any). The quantity (P−(O/E)) for the days remaining is then calculated with values for the next highest tier and the expected usage is increased by the extra energy consumed due to load shifting for Y days. Steps 313 and 315 may be iteratively repeated with respect to newly created (sub-divided) rate periods until such time that the number of cycles Y of load shifting for each sub-divided time period that can be executed before crossing into the next tier exceeds the number of days available for load shifting in that sub-divided time period.

Figure 7:
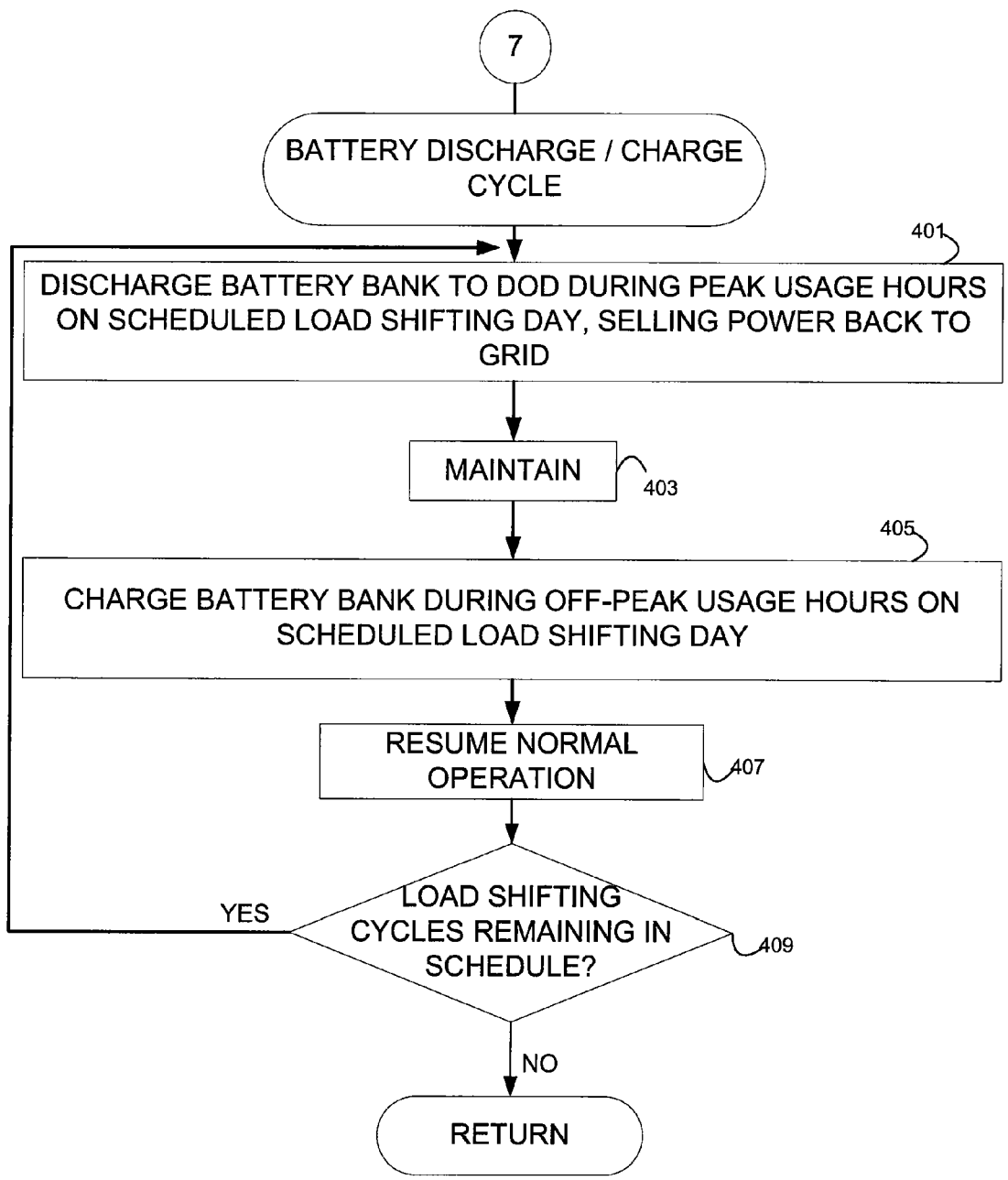
FIG. 7 is a flow chart illustrating a battery charge/discharge cycle process in accordance with an aspect of the invention, and forming sub-part of the load shifting process illustrated in FIGS. 5A-5B.

The exemplary battery discharge/charge cycle illustrated in FIG. 7 is now described. Therein, it may be assumed that the battery is fully charged at the start. In step 401, the battery is discharged during peak usage hours on the next scheduled load shifting day. Typically, the discharged power would be sold back to the grid, or alternatively, it could be used directly to meet power demands at the premises (in lieu of buying power from the grid to meet that demand). Next, in step 403, the battery is maintained in its discharged state until arrival of the off-peak usage hours of the scheduled load shifting day. As shown in step 405, the battery bank is charged to its full capacity during the off-peak usage hours on the scheduled load shifting day. The system can then resume a mode of normal UPS operation, e.g., wherein the battery performs a back-up function to supply energy in the event of a grid power outage or curtailment. This continues until arrival of the next scheduled load shifting day (assuming there are additional load shifting cycles remaining in the schedule, as determined at step 409). The cycle steps 405-409 repeat until there are no more load shifting cycles remaining in the schedule, whereupon control returns to end the process of FIGS. 5A-5B.

The invention may be implemented in software, firmware, hardware, or a combination of these three. Any of the method steps described herein can be implemented in computer software and stored on computer-readable medium for execution in a general-purpose or special-purpose computer or device (including PLDs, PGAs, etc.) and such computer-readable media are included within the scope of the invention. The special-purpose or general-purpose computer may comprise a network interface for communicating over a network to carry out various principles of the invention.

The present invention has been described in terms of preferred and exemplary embodiments thereof. Numerous other embodiments, modifications and variations within the scope and spirit of the appended claims will occur to persons of ordinary skill in the art from a review of this disclosure.

The invention claimed is:

1. A computer-assisted method of electrical energy load shifting utilizing an electrical energy storage device connected to receive electrical energy from an electrical power grid, comprising the steps of:
   establishing a budget of unreserved cycles of discharging and charging the electrical energy storage device for load shifting purposes within a given time period, the budget of unreserved cycles is based on rated cycles of the electrical energy storage device and reserved cycles of the electrical energy storage device;
   establishing a schedule for load shifting within sub-parts of said time period, based upon said budget and input data regarding multiple rate levels applicable to electrical energy available from the electrical power grid during the sub-parts of said time period; and
   executing load shifting cycles within one or more of said sub-parts of said time period, in accordance with said schedule, by discharging electrical energy stored in said electrical energy storage device in a first interval for which a first rate is applicable to energy available from the grid, and charging said electrical energy storage device with electrical energy obtained from the grid during a second interval for which a second rate lower than said first rate is applicable to energy obtained from the grid.

2. A computer-assisted method according to claim 1, wherein said budget is computed by a data processor based at least in part on an input indicating a cycle life of the electrical energy storage device.

3. A computer-assisted method according to claim 2, wherein said budget is computed by said data processor further based upon a specified depth of discharge (DoD) of said electrical energy storage device for said load shifting cycles.

4. A computer-assisted method according to claim 3, wherein said budget is an optimal budget selected so as not to reduce the time life of the electrical energy storage device.

5. A computer-assisted method according to claim 1, wherein said budget is computed by a data processor based at least in part on an input indicating a time life of said electrical energy storage device.

6. A computer-assisted method according to claim 1, wherein said budget is computed by a data processor based at least in part on an input reflecting a number of cycles reserved for purposes other than load shifting.

7. A computer-assisted method according to claim 1, wherein said budget is computed by a data processor based at least in part on:
   an input indicating a cycle life of the electrical energy storage device;
   an input indicating a time life of said electrical energy storage device; and
   an input reflecting a number of cycles reserved for purposes other than load shifting.

8. A computer-assisted method according to claim 7, wherein the step of establishing a schedule for load shifting comprises splitting the time period into rate periods, and calculating values of P−(O/E) for days within each rate period, where P is a peak rate applicable to energy obtained from the grid during a first time interval of any given day, O is an off-peak rate applicable to energy obtained from the grid during a second time interval of the given day, and E is a measure of the efficiency of the electrical energy transfer during a cycle of discharging and charging the electrical energy storage device.

9. A computer-assisted method according to claim 8, wherein a rate schedule applicable to the rate periods has energy usage level-based tiers, said method further comprising calculating the values P−(O/E) for days within each rate period so as to account for increased rates applicable to electrical energy usage above a tier boundary representing a maximum energy usage within a rate period before crossing into the next tier.

10. A computer-assisted method according to claim 9, further comprising:
   recording an expected energy usage for each rate period apart from any load shifting;
   calculating an additional amount of energy that will be used by a load shifting cycle;
   calculating for each rate period the number of cycles Y of load shifting that can be executed before crossing into the next tier;
   sub-dividing the rate periods into days corresponding to number of cycles Y, and days remaining; and
   calculating the quantity P−(O/E) for days remaining with values for the next highest tier.

11. A computer-assisted method according to claim 1, wherein said sub-parts of said time period comprise days and the schedule is computed by a data processor based at least in part on a ranking of days within the time period according to a computation of cost savings realizable by load shifting on those days.

12. A computer-assisted method according to claim 11, wherein the computation of said cost savings (S) is based on the formula S=P−(O/E), where P is a peak rate applicable to energy obtained from the grid during a first time interval of any given day, O is an off-peak rate applicable to energy obtained from the grid during a second time interval of the given day, and E is a measure of the efficiency of the electrical energy transfer during a cycle of discharging and charging the electrical energy storage device.

13. A computer-assisted method according to claim 12, wherein the unreserved cycles of the budget are allocated to days within the time period in the order of said ranking, from greatest cost savings to least, but only so long as P−(O/E)>0.

14. A computer-assisted method according to claim 13, wherein in event that the budget of unreserved cycles exceeds a number of days when P−(O/E)>0, the budget is recomputed based upon an increased depth of discharge (DoD), to more closely match the budget to the number of days when cost savings are realizable through load shifting, and said discharging is set to be carried out down to the increased DoD.

15. A computer-assisted method according to claim 11, wherein said time period is a year.

16. A computer-assisted method according to claim 1, wherein rate periods correspond to billing cycles of a supplier of electrical energy to the grid.

17. A computer-assisted method according to claim 1, wherein said sub-parts of the time period comprise days, and the executing of load shifting cycles comprises discharging said energy storage device during a first time interval of each day to which a peak rate P is applicable to energy obtained from the grid, and charging the energy storage device with energy obtained from the grid during a second time interval of each day to which an off-peak rate O is applicable.

18. A computer-assisted method according to claim 17, wherein at least a portion of the energy discharged from the electrical energy storage device during the first time interval is supplied back to the grid.

19. A computer-assisted method according to claim 17, wherein said discharging of the electrical energy storage device is carried out down to a target state of charge (SoC), and said SoC is held substantially constant following said discharging and up until said charging during the second time interval.

20. A computer-assisted method according to claim 1, wherein said electrical energy storage device comprises at least one battery.

21. An electrical energy management system permitting load shifting, comprising:
   power electronics for interfacing with an electrical power grid in order to obtain power therefrom;
   an electrical energy storage device for receipt and storage of electrical energy from the grid through said power electronics;
   a control module configured to control said power electronics to carry out load shifting within a given time period, in accordance with a schedule for load shifting within sub-parts of said time period, load shifting cycles being executed within one or more of said sub-parts of said time period by discharging electrical energy stored in said electrical energy storage device in a first interval for which a first rate is applicable to energy available from the grid, and charging said electrical energy storage device with electrical energy obtained from the grid during a second interval for which a second rate lower than said first rate is applicable to energy obtained from the grid; and
   a control computer operably connected to said control module, said control computer including a memory containing computer-executable instructions that, when executed by said computer, cause said computer to perform the steps of:
   establishing a budget of unreserved cycles of discharging and charging an electrical energy storage device for load shifting purposes within a given time period, the budget of unreserved cycles is based on rated cycles of the electrical energy storage device and reserved cycles of the electrical energy storage device; and
   establishing a schedule for load shifting within sub-parts of said time period, based upon said budget and input data regarding multiple rate levels applicable to electrical energy available from the electrical power grid during the sub-parts of said time period.

22. An electrical energy management system according to claim 21, wherein said computer executable instructions cause said computer to compute said budget based at least in part on:
   an input indicating a cycle life of the electrical energy storage device;
   an input indicating a time life of said electrical energy storage device; and
   an input reflecting a number of cycles reserved for purposes other than load shifting.

23. An electrical energy management system according to claim 21, wherein said sub-parts of said time period comprise days and the schedule is computed by the computer based at least in part on a ranking of days within the time period according to a computation of cost savings realizable by load shifting on those days.

24. An electrical energy management system according to claim 23, wherein the computation of said cost savings (S) is based on the formula S=P−(O/E), where P is a peak rate applicable to energy obtained from the grid during a first time interval of any given day, O is an off-peak rate applicable to energy obtained from the grid during a second time interval of the given day, and E is a measure of the efficiency of the electrical energy transfer during a cycle of discharging and charging the electrical energy storage device.

25. An electrical energy management system according to claim 24, wherein the unreserved cycles of the budget are allocated to days within the time period in the order of said ranking, from greatest cost savings to least, but only so long as P−(0/E)>0.

26. An electronic data storage medium containing computer-executable instructions that, when executed by a computer forming part of an electrical energy management system permitting load shifting, cause the system to perform the steps of:

establishing a budget of unreserved cycles of discharging and charging an electrical energy storage device for load shifting purposes within a given time period, the budget of unreserved cycles is based on rated cycles of the electrical energy storage device and reserved cycles of the electrical energy storage device;

establishing a schedule for load shifting within sub-parts of said time period, based upon said budget and input data regarding multiple rate levels applicable to electrical energy available from the electrical power grid during the sub-parts of said time period; and executing load shifting cycles within one or more said sub-parts of said time period, in accordance with said schedule, by discharging electrical energy stored in said electrical energy storage device in a first interval for which a first rate is applicable to energy available from an electrical power grid, and charging said electrical energy storage device with electrical energy obtained from the electrical power grid during a second interval for which a second rate lower than said first rate is applicable to energy obtained from the grid.

27. An electronic data storage medium containing computer-executable instructions according to claim 26, wherein said computer executable instructions, when executed, cause said computer to compute said budget based at least in part on:

an input indicating a cycle life of the electrical energy storage device;

an input indicating a time life of said electrical energy storage device; and an input reflecting a number of cycles reserved for purposes other than load shifting.

28. An electronic data storage medium containing computer-executable instructions according to claim 26, wherein said sub-parts of said time period comprise days and the instructions cause the schedule to be computed by the computer based at least in part on a ranking of days within the time period according to a computation of cost savings realizable by load shifting on those days.

29. An electronic data storage medium containing computer-executable instructions according to claim 28, wherein the computation of said cost savings (S) is based on the formula S=P−(0/E), where P is a peak rate applicable to energy obtained from the grid during a first time interval of any given day, 0 is an off-peak rate applicable to energy obtained from the grid during a second time interval of the given day, and E is a measure of the efficiency of the electrical energy transfer during a cycle of discharging and charging the electrical energy storage device.

30. An electronic data storage medium containing computer-executable instructions according to claim 29, wherein the unreserved cycles of the budget are allocated to days within the time period in the order of said ranking, from greatest cost savings to least, but only so long as P−(0/E)>0.

* * * * *